March 10, 1959 L. E. LEE 2,877,070
FLUID PRESSURE SEAL
Filed March 30, 1956
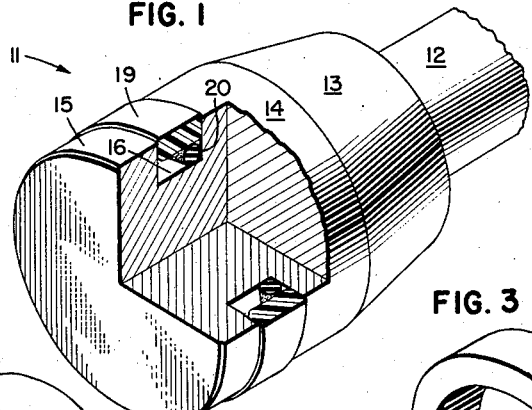
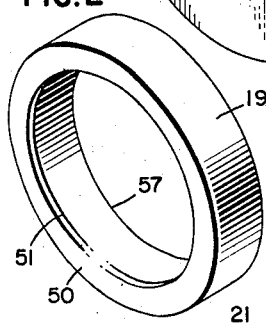
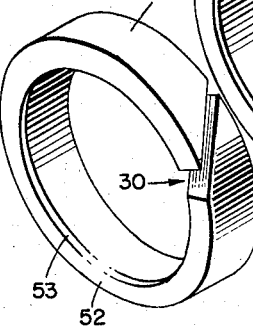
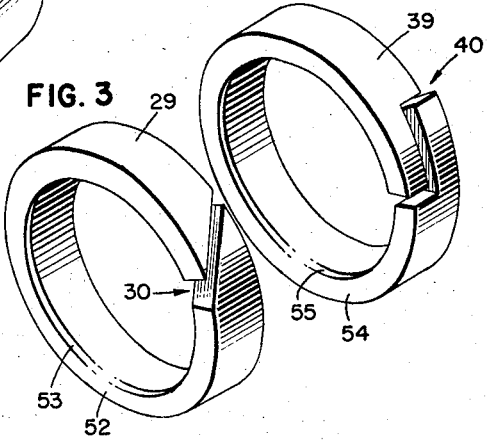
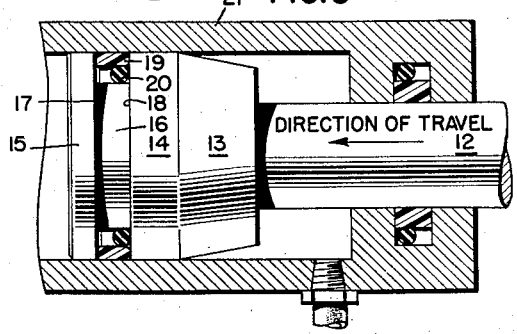
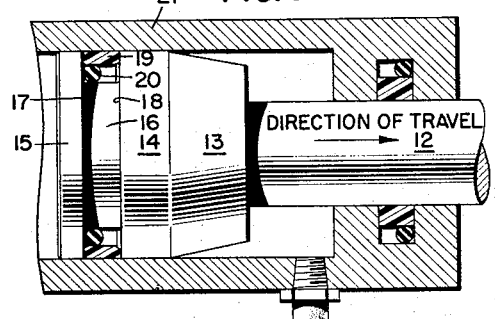
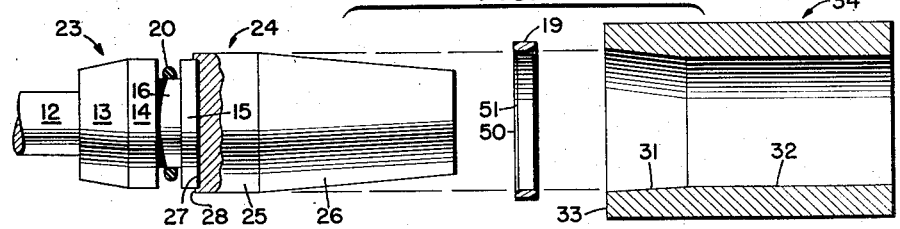
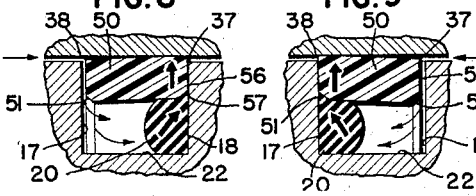
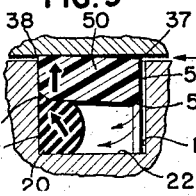
INVENTOR
LUTHER E. LEE
BY
ATTORNEYS

United States Patent Office 2,877,070
Patented Mar. 10, 1959

2,877,070

FLUID PRESSURE SEAL

Luther E. Lee, Takoma Park, Md.

Application March 30, 1956, Serial No. 575,284

4 Claims. (Cl. 309—23)

(Granted under Title 35, U. S. Code (1952), sec. 266)

The invention described herein may be manufactured and used by or for the Government of the United States of America for governmental purposes without the payment of any royalties thereon or therefor.

The present invention relates to a fluid pressure seal and more particularly relates to a durable seal satisfactory for either low or extremely high pressures which will provide high sealing capacity and expand under pressure to form a cup seal and wherein an outer Teflon ring exhibiting properties of a low coefficient of friction contacts moving parts of a mechanism and an inner rubber O ring contacts stationary parts of the mechanism so that a minimum of wear and a maximum of sealing efficiency is attained.

A very substantial number of prior art devices have attempted to provide sealing under relatively high pressure with low wear, however, in all such devices, wear did occur, the devices proved insufficient from the standpoint of durability, they did not possess high sealing capacity and were particularly susceptible to dirt or particles which inadvertently became wedged in the sealing means to thereby destroy the seal.

Some of the prior art devices proved satisfactory to a limited extent where extremely low pressures or extremely high pressures were not involved for example, the patented device of N. A. Christensen, Patent No. 2,509,672 for Sealing Device, issued May 30, 1950; the device of R. D. Smith et al., Patent No. 2,607,644 for Sealing Means, issued August 19, 1952; and the device of W. F. Mitchell, Patent No. 2,661,967 for Fluid Seal, issued December 8, 1953. In each of these devices interposed between a soft rubber sealing O ring and the wall of a piston cylinder is an expansible metal band and in the case of Christensen the band includes overlapping step shaped tongues to constitute the movable joint for the ring. In each of these patented devices the rings allegedly worked satisfactorily for the pressures involved in their use which were of the order of from 1500 to 5000 pounds per square inch to provide an allegedly leak-proof seal without imposing too objectionable a friction load on and interfering with the desired movement of the piston or similar member to which the seal was applied and without causing too much objectional extrusion and undue wear of the sealing means. In the patented device of E. F. Jackman, Patent No. 2,349,170 for Sealing Device, issued May 16, 1944, similar means were used, however, a soft retaining ring 63 was used with the inner soft rubber O ring 60. This, however, was not only as unsatisfactory as the prior art devices for extremely high pressures but in addition leakage occurs at almost all pressures.

Pressure back-up rings of a material known commercially as Teflon and described in the patent to Robert M. Joyce, Jr., Patent No. 2,394,243 for Process for Polymerizing Tetra-Fluoroethylene, patented February 5, 1946 was utilized, for example, in the patents to A. C. Waring, Patent No. 2,494,598 for Hydraulic Packing and Seal, issued January 17, 1950, and the patent to R. E. Krueger, Patent No. 2,728,620 for Pressure Seals, issued December 27, 1955. However, although these patents used a Teflon back-up ring with a soft rubber inner ring, these patented devices also failed to overcome disadvantages of the prior art in that they could not withstand very high pressures of the order encountered in use of the present device and the devices were particularly susceptible to destruction both because of dirt particles and forcing out of the seal means under extremely high pressures.

Several devices attempted to overcome problems of resiliency, for example, the device of C. A. Neal, Patent No. 1,591,876 for Packing, issued July 6, 1926, the device of J. C. Monahan, Patent No. 2,557,835 for Seal, issued June 19, 1951, the device of R. O. Hallen, Patent No. 2,437,814 for Sealing Means, issued March 16, 1948, and the device of R. E. L. Martin, patented December 31, 1907, for Piston-Rod Packing, Patent No. 875,363. In each of the devices described in these patents the rings were split in an attempt to overcome the disadvantages of the prior art, however, none of these devices were able to produce a sealing means satisfactory for the purposes of this invention.

The present invention overcomes these and other disadvantages of the prior art and in addition provides a sealing device for use with extremely low, intermediate and extremely high pressures, wherein the high pressures may approach from 38,000 to 67,000 pounds per square inch or even higher and wherein are provided features leading to reduce wear, long-lasting effectiveness, high sealing capacity, capability of expansion upon pressure to form a cup seal, a low coefficient of friction between an outer ring and moving surfaces with a very deformable inner O ring, and wherein either split or straight type outer rings can be utilized and which device can be assembled with facility and without the use of special tools and wherein accidental deposition of dirt particles will not irreparably injure the sealing effectiveness and yet which will be economical, safe and lend itself readily to facility of manufacture.

Accordingly, an object of the present invention is to provide a durable, satisfactory seal for low or extremely high pressure.

Another purpose of the invention is the provision of a sealing device of relatively low cost and of such construction that it may be assembled easily.

Another aim of the invention is the provision of a sealing device having relatively low friction between itself and the part that it engages while at the same time substantially eliminating leakage, particularly at very high pressures.

Another object of the invention is the provision of a sealing device for high pressure application which accommodates itself to relatively large variations in dimensions and avoids the necessity of high accuracy in the finishing and machining of the parts which are to be sealed.

Another purpose of the invention is the provision of a sealing device which will have a long wearing life.

Another object of the invention is the provision of a sealing device which will be satisfactory for low or extremely high pressure and which may be operated under varying ambient conditions of temperature and pressure.

Another aim of the invention is the provision of a sealing device which is self-centering and which will be operative in the presence of extremely high pressure.

Another purpose of the invention is the provision of a sealing device which accommodates itself with variations in the expansion and contraction of the metal of the surrounding parts resulting from temperature and pressure changes.

Another aim of the invention is the provision of a sealing device especially adaptable for use with extremely high pressures and wherein extrusion into the circumferential clearance between the interfitting parts surrounding the sealing device will be prevented.

Another object of the invention is the provision of a seal which is adaptable to high or low pressure use and which will not break down in service.

Another aim of the invention is to provide a sealing device capable of preventing locking or wedging between two interfitting circular parts that it seals.

Another purpose of the invention is the provision of a sealing device which will operate under extremely high fluid sealing pressures and will be especially adaptable for use in pistons wherein a tremendous amount of pressure is to be utilized.

Another aim of the invention is to provide a seal applicable to extremely high pressure use and wherein is provided a comparatively high rate of recovery after distortion such that appreciable leakage of fluid past the seal may not take place.

Another purpose of the invention is to provide a seal adaptable for extremely high pressures and wherein abrasion due to particles of dirt or other foreign matter of the sealing means to cause breakdown of the sealing means is prevented.

Another object of the invention is to provide a sealing means suitable for rotating or reciprocating parts in various engine and machine assemblies as for instance reciprocating pistons and the like and wherein is provided a multiple-part sealing means including an outer Teflon ring member adapted to engage a moving surface and an inner soft material O ring member, for example, a resilient compressible rubber O ring member to engage the stationary surfaces of the engine and which sealing means is of construction such that the rubber member need not be free of scarring or surface deformation due to particles of dirt or due to extremely high pressures introduced into the mechanism in order to operate properly.

Another purpose of the present invention is to provide sealing structure which can utilize the advantages of resilient non-metallic rings and yet which overcomes the difficulties heretofore experienced when prior art sealing devices are moved across a cylinder wall.

Another object of the present invention is to provide sealing or packing means embodying a cylindrically-shaped surrounding Teflon ring and an inner O ring for sealing against hydraulic pressure between two relatively movable members, which will be characterized by simple yet very effective means for preventing extrusion of the material of either the O ring or sealing ring and wherein injury to the O ring will not cause breakdown of the seal, wherein the sealing means is effective in providing and maintaining a dependable fluid seal at extremely low temperatures as well as at elevated temperatures under very high fluid pressure conditions and which is very long wearing even under severe and adverse conditions of operation.

Another purpose of the invention is to provide seal members of the type described herein designed to permit easy assembly of the seal and to provide elastic flow of the cushioning ring so as to give a highly effective fluid type seal under extremely unfavorable ambient conditions for example, conditions of very high pressures in the neighborhood of from about 38,000 to 78,000 pounds per square inch of pressure directed against the seal.

Another purpose of the invention is to provide means for limiting or confining the elastic flow of the cushioning ring in a seal adaptable for use with reciprocating devices such as pistons.

Another aim of the invention is to provide for a sealing and packing device which is compact in form, simple in construction, reliable in use, thoroughly practical commercially and which will function effectively as a packing or a seal for a moving rod or plunger with but relatively little wear on the packing, the rod or the plunger on which the packing is mounted and which will be operable under either low or extremely high pressures.

Another object of the invention is to provide a hydraulic packing and seal which is especially suitable for high pressure hydraulic use even at pressures in the neighborhood of 67,000 pounds per square inch and sometimes higher, which will not score highly polished cylinders and in turn will not be chipped by cylinder surface of somewhat lesser smoothness, and which provides a packing employing a rubber O ring in a protected position so that the rubber cannot be squeezed or extruded past containing elements.

Another object of the invention is to provide a hydraulic seal which will have reduced wear, which will be long-lasting, which will have a high sealing capacity, which will expand under pressure to form a cup seal and which will utilize the low coefficient of friction of a Teflon ring to provide a minimum of friction between relatively moving parts, which is adaptable to either use in a split or straight type ring, which can be assembled without special tools, which will have high resistance to wear and long-lasting sealing ability, which will be economical in initial cost, which will be readily utilizable at pressures over a very wide range, and which is susceptible of manufacture with varied dimensions for adaptability to particular ambient conditions of fluid pressure.

Other objects and many of the attendant advantages of this invention will be readily appreciated as the same becomes better understood by reference to the following detailed description when considered in connection with the accompanying drawings wherein:

Fig. 1 is a perspective view of a piston showing a preferred embodiment of the sealing means of the present invention with a portion of the piston shown broken away to better represent the interior seal and seal retaining groove;

Fig. 2 illustrates one preferred embodiment of the outer ring portion of the sealing means of the present invention;

Fig. 3 illustrates a modified form of the ring portion of the seal shown in Fig. 2;

Fig. 4 illustrates a further modified form of the ring portion of the seal shown in Fig. 2;

Fig. 5 is a longitudinal sectional view illustrating the piston of Fig. 1 in a hydraulic cylinder, and showing the piston moving in one direction;

Fig. 6 is a sectional view similar to the view of Fig. 5, showing the piston moving in an opposite direction;

Fig. 7 is an exploded view, partly in section, illustrating tools employed and one preferred method of assembly of the piston of Fig. 1 showing incorporation of the seal means of the present invention;

Fig. 8 is an enlarged fragmentary sectional portion of the piston of Fig. 5 showing fluid pressure and seal reaction responsive to the pressure during piston travel in one direction; and Fig. 9 is an enlarged fragmentary sectional portion of the piston of Fig. 6 showing fluid pressure and seal reaction during piston travel in the opposite direction.

In the present invention a fluid pressure seal is shown suitable for use in engines or other mechanisms, such as for example, the piston and cylinder device shown in Fig. 1 which comprises essentially a surface engaging Teflon ring where the Teflon ring moves relative to the surface and an inner relatively stationary but deformable O ring made for example of rubber, which may be readily assembled by the inventive method described hereinafter and which will provide a long-lasting, durable and satisfactory seal for low or extremely high pressure.

Referring more particularly to the figures wherein is shown preferred embodiments of the present invention, a piston member or other reciprocating member adapted to be utilized under heavy fluid pressure generally designated by the numeral 11 may comprise a shaft 12, a tapered portion 13 bearing portions 14 and 15 which may define therebetween an undercut portion or groove 16. Groove 16 may have side walls 17 and 18 respectively, and a bottom surface 22.

Disposed in the groove 16 may be an outer Teflon ring 19. Outer ring 19 hereinafter described as the Teflon ring may be composed of a stable synthetic plastic such as polymerized tetra-fluoroethylene known by the name Teflon. This material has a low coefficient of friction which is of the order of 0.1 with respect to metal surfaces as compared to a coefficient of friction of the order of 0.45 for the rubber of which the O ring 20 may be composed. Teflon will bend and restore to normal but it will not compress appreciably or flow under normal operating conditions. Thus, an outer ring composed of this material will bend outwardly to completely seal the space between the piston assembly and the piston cylinder which will be described but it will not flow into this space. In addition, a stable synthetic plastic material such as Teflon will resist high temperatures whereas conventional outer rings such as metal may become hard and brittle and may tear the inner O ring. Also such stable synthetic plastic material will retain its shape after exposure to high temperatures and the shape of the outer rings of my invention serves to prevent excessive deflection of the O ring even though the O ring may become hard and brittle due to exposure to high temperatures. In this specification the terms "outer ring" is intended to mean the ring which moves appreciably relative to a bearing surface and "inner ring" refers to the O ring designed for small movement relative to an opposite surface of an engine assembly with the temperatures designed to be utilized with this invention experiment shows Teflon to be a fine material, however, it is contemplated that the more expensive material Kel-F may be utilized under some different ambient conditions and such use is within the scope of this invention. A description of the process for polymerizing tetra-fluoroethylene may be found in the patent of Robert M. Joyce, Jr., Patent No. 2,394,243 for Process for Polymerizing Tetra-Fluoroethylene, patented February 5, 1946.

As shown in Figs. 2, 3, and 4 each of the end walls 50, 52, and 54 of the Teflon rings 19, 29, and 39, respectively, is chamfered as shown at 51, 53, and 55, respectively, and on the opposite sides not shown in these figures but indicated in Figs. 8 and 9 where chamfer 57 is shown on the end wall 56. It should be understood that it is important that this chamfer be disposed accurately around the inner surface of the rings such that the chamfer depth is constant in machining, to thus insure equal disposition of pressure against these chamfered surfaces. The chamfer can be made as a 45° chamfer from .005" to .01" in length although the invention is not to be construed as so limited. The chamfer accomplishes two main objects, first it allows the O ring to form and to flow into the angular chamfer thus formed as best shown in Figs. 8 and 9 to bear against the end walls of the groove 16 of the piston 11 and secondly upon application of pressure to the O ring this helps the cup washer action of the O ring to seat itself against the piston side walls which causes action similar to vacuum cup pressure action to thereby effect a far better seal. It has been shown experimentally that these chamfers disposed on each edge of the inner bores of the members 19, 29, and 39 is very significant, in some cases more than doubling the amount of pressure which the sealing device of the invention can withstand without breakdown.

As indicated above, disposed between the outer Teflon ring 19 and the bottom surface 22 of the groove 16 may be an O ring 20. O ring 20 acts as a sealing agent and expander and is preferably made of a material such as rubber.

As shown in Figs. 5 and 6 the piston assembly, including the outer ring 19 and the O ring 20 may be disposed in a piston cylinder 21 for reciprocating or other motion therein. Although, in Figs. 1, 5, 6, 8, and 9 the continuous form of the outer ring 19 is utilized, it is contemplated within the scope of the invention, that diagonal split outer ring 29 or step split ring 39 may be provided in place of the continuous O ring 19 operatively illustrated. Ring 29, shown in Fig. 3, may be split at approximately a 60 degree angle as shown by the split 30. As shown in Fig. 4 ring 39 may be step split as shown at 40.

Fig. 7 shows the inventive method of providing an effective sealing means and tools which may be utilized with this method. As shown to the left of Fig. 7 an O ring 20 may be provided in the groove 16 of piston 11 by conventional means. The method of forming the finished article shown in Figs. 5 and 6 can be accomplished as follows: The Teflon ring 19 shown at the center in Fig. 7 would be submerged in water at 180° F. for one minute. Teflon ring 19 would then expand such that it could be easily slipped over assembly 23 shown at the left of Fig. 7. By means of heating in the water the Teflon ring 19 will assume the relative size shown at the center of Fig. 7.

A tool generally designated at 24 has a straight surface portion 25, a tapered portion 26, and a groove 27 counterbored or otherwise formed in the tool end face 28. As stated above the Teflon ring 19 may be submerged in water at a temperature of 180° F. for a period of about one minute. The Teflon ring 19 thus expands and may be slipped over the straight portion 25 of tool 24 which is held against one edge of the piston 23, the piston edge extending into fitting relationship in groove 27. This will serve to cause alignment such that the Teflon ring 19 may be disposed into the groove 16 in the piston portion 23. The tool 34 having inner tapered bore 31 and inner straight bore 32 may then be slipped over tool 24 and urge the ring 19 into the groove 16 of portion 23 of piston 11 until the straight bore 32 of the tool 34 is disposed over the Teflon ring 19 to exert radially inwardly directed pressure on Teflon ring 19 while it is cooling. In this position the tool 34 is left standing for two minutes over Teflon ring 19 and the combined diminution of temperature and the pressure of tool 34 will then permit the Teflon ring 19 to shrink correctly into groove 16. Tools 34 and 24 may then be withdrawn.

As best shown in Figs. 8 and 9 and further referring to Figs. 5 and 6 operation of the seal will take place as follows: Upon application of pressure in a first direction as shown in Fig. 8 at a very low initial pressure, even as low as ten pounds per square inch the O ring 20 will deform against the Teflon ring 19 such that it will force it against the upper wall portion 37 of piston cylinder 21. An effective seal is thus caused by means of the concerted action of the O ring 20 and the Teflon outer ring 19 in bearing against the side wall 18 and portion 37 of the cylinder. This will effectively seal off all higher pressures which may be instituted up to the breaking point.

As shown in Fig. 9 upon reverse or reciprocating action the exact effect in the opposite direction will take place to seat the corner of Teflon outer ring 19 against face 17 of groove 16 and against a portion for example, 38 of the cylindrical wall 21. In this manner a most effective seal against very high pressures is effected and may be effected also at very low pressures of the order of ten pounds per square inch. Wearing of the Teflon against the piston cylinder will be very slight due to the low coefficient of friction of Teflon and the nature of the material. Furthermore, even should the outer surface of the Teflon wear appreciably it will merely serve to coat the cylinder walls with Teflon which will in effect make the cylinder walls less porous and minimize possibility of wear and destruction. In addition, the wearing on the bottom surface 22 of groove 16 will not be appreciable because of the limited rolling of the O ring therealong and even should nicks in the rubber O ring occur or other deformation of that surface be caused sealing action is provided by the outer Teflon ring 19 in conjunction therewith such that proper sealing may still be effected. To restate, upon initial application of low pressure of the order of ten pounds per square inch the outer Teflon ring will be urged against the piston cylinder inner wall and the side wall defining the piston groove toward which hydraulic pressure is directed and the deformable O ring will seat itself against the side wall and be deformed into the wedge opening formed between the chamfer portion of the inner surface of the Teflon ring and the side wall of the groove to thereby afford cup-like wedging action of the O ring to form an optimum seal in addition to permitting maximum radial urging of the Teflon ring against the cylinder walls. It should further be noted that as best shown in Figs. 5 and 6 the Teflon ring is the ring which is best adapted to be urged against the metal part of the reciprocating plunger arrangement wherein motion between the Teflon and the metal is to take place. For example, the reduced shaft (not numbered) shown at the right of Fig. 5 is in motion in operation and bearingly urged against it is the Teflon inner ring (not numbered) such that the Teflon in rubbing against the metal in motion therebetween and upon any wear will form a Teflon coat against the metal which will then become non-porous because of the non-porosity of Teflon and the coating will aid in providing an effective seal and more efficient operation due to the low friction coefficient and other properties of Teflon. Thereby is provided less wear due to friction and a better elimination of unwanted porosity and leakage such that leakage may be most effectively reduced.

Thus, it is shown that a method of manufacturing a piston having the improved sealing action of the present device and an improved seal are provided which will be durable, satisfactory for low to extremely high pressure and which is economical to manufacture. The seal may essentially comprise an inner rubber O ring, an outer Teflon ring chamfered on both ends of its inner bore and, the O ring and Teflon ring being disposed in a groove of a piston or plunger device such that reciprocating action under low, intermediate and high fluid pressures may most readily be effected.

It should be understood, of course, that for the ambient conditions of the invention and the pressures utilized Teflon is contemplated as the material for the outer ring. However, it is contemplated as within the scope of the invention that in certain conditions other plastics of their toughest and highest melting grades may be used instead of Teflon, for example, polyethylene or vinyl chlorides, fluorides or mixtures of them may be used in some cases. However, Teflon is the contemplated method of the inventive device for most applications. The inner ring or O ring 20 of the invention may be made of any rubber of extreme toughness, softness, and proper oil-proof characteristics with respect to mineral, castor and other oils utilized for fluid pressure. Natural rubber may be used if castor oil and alcohol are the only fluids that will be encountered in service. However, ring 20 may also be made where appropriate of neoprene or Buna S rubber which latter is also known as GR–S.

Although, the invention is in nowise to be limited by these dimensions, by way of example, in tested experimental applications of the present device for a .875" inner diameter of the Teflon ring, the sealing device withstood 3,800 pounds per square inch pressure in use. For an inner diameter of the ring of .865" the pressure withstood was 54,000 pounds per square inch and for an inner diameter of .855" a pressure of 68,000 pounds per square inch was attained without collapsing. Although the invention is not to be restricted to this figure the outside diameter of the Teflon ring may be in the range from 1.003" to 1.05". Approximately the same diameters may be utilized in the modified rings shown split diagonally in Fig. 3 and shown step split in Fig. 4. In experiments for corresponding inside diameters the split rings of Figs. 3 and 4 held the same pressures as the non-split or straight ring shown in Fig. 2 herein. In the rings of Figs. 3 and 4 the split is closed of course by pressure on either side of the ring.

The assembly of Figs. 5 and 6 with the inventive fluid pressure seal can withstand fluid pumped from zero pounds per square inch to 67,000 pounds per square inch and with small minor Teflon ring diameters can withstand even higher pressures. With reference to Fig. 8 at the initial start of movement of the piston to the left for example, under pressure as low as ten pounds per square inch the O ring will move to the right and form a cup like pocket. In this pocket fluid pressure forces the Teflon ring against the piston side walls and the piston cylinder wall and forces the O ring against the piston side wall and Teflon ring to seal other openings. As shown in Fig. 9 the piston when moving to the right causes the outer Teflon ring and the inner ring to move to the other side of the groove forming a cup washer as shown in that figure. In the experimental embodiment used the Teflon rings had thicknesses of .138" and .140".

By way of illustration only and in nowise to be considered as limiting, in one embodiment built and tested the piston had an outside diameter of .998", outer diameter 25 of tool 24 was made 1.01" in diameter, the depth of groove 27 was .062" and the inside diameter of that groove was of dimensions to fit over the outside diameter of the piston. The inside diameter of O ring 20 which was the diameter of piston 11 at groove 16 was .696", tapered bore 31 of tool 34 was made with a maximum diameter of 1.125" and a minimum diameter of 1.015" which was the diameter of the smooth bore 32 and the tapered bore 31 had a depth of .625". Experimental results showed that the device of Fig. 1 had effective sealing for .875" inner diameter of the Teflon ring, .865" inner diameter of the Teflon ring and .855" inner diameter of the Teflon ring of respectively 38,000, 54,000, and 68,000 pounds per square inch, obtained by raising pressure from 0 to 5,000, 10,000 pounds per square inch, etc., and holding for one minute. Upon reaching the maximum pressures afore-mentioned, a bypass occurred. Pressure was first released to 0 pound per square inch and then raised again the same as before. This was repeated several times. No bypass occurred lower than the first test. In these tests the split and non-split rings all bypassed fluid within a few pounds of each other. Upon removing the outer Teflon rings and the inner O rings and thoroughly inspecting no deformation or wear could be found. Should pressure in excess of 68,000 pounds per square inch be desired, the minor diameter of the Teflon ring could be further reduced. The pressures indicated were obtained in a cylinder having an area .7854" for safety and economical reasons. However, it is within the inventive scope that any size cylinder, piston rod, or the like can be sealed by the small double-acting cup washer of the invention. In a special test made at 76,000 pounds per square inch using a cylinder having .7854" area, stroke 4.0", a threaded plug was used at the bottom of the cylinder as shown in Figs. 5 and 6 of the drawings and the plug was screwed in tight enough to bypass fluid at 76,000 pounds per square inch. It was found that fluid bypassed through the threaded area in the form of mist at temperatures at about 180° F. No damage was done to the outer Teflon ring or the inner O ring in this experiment.

Obviously many modifications and variations of the present invention are possible in the light of the above teachings. It is therefore to be understood that within the scope of the appended claims the invention may be practiced otherwise than as specifically described.

What is claimed is:

1. In a piston assembly comprising a cylindrical member having an inner wall, a piston disposed within said cylindrical member and movable along said inner wall, said piston having first and second bearing surfaces and an annular groove formed therebetween and provided with a pair of mutually spaced side walls connected to said bearing surfaces respectively, and a circumferential bottom wall substantially axial to the movement of said piston, piston sealing means comprising an O-ring disposed within said groove in engagement with said bottom wall for movement axially between said pair of side walls of the groove and a Teflon ring having an outer surface, an inner surface, a pair of side walls connecting said surfaces and an annular chamfered portion positioned at each side wall thereof, said Teflon ring being disposed within said groove with said side walls thereof normally in proximate relation with respect to the side walls of the groove, the inner surface in engagement with said O-ring and the outer surface in engagement with said inner wall of the cylindrical member, said Teflon ring extending axially to the movement of the piston for axial movement within and between said side walls of the groove in response to fluid pressure applied to the side walls of said Teflon ring, the pressure applied to one side wall of the Teflon ring causing the other side wall thereof to move into sealing engagement with the corresponding side wall of the groove and with said inner wall at a point adjacent said other side wall and concurrently therewith deform and urge the O-ring into sealing engagement with the bottom wall of the groove, the inner surface of the Teflon ring, the other side wall of the groove and with the cooperating annular chambered portion of the Teflon ring.

2. A piston assembly comprising a piston, the exterior surface of said piston defining a circumferential groove, a first ring seated in said groove, said first ring having a cross-sectional dimension less than the width of said groove, a second ring composed of a stable synthetic plastic having a lower coefficient of friction and better wearing characteristics than the material of said first ring, said second ring having a chamfered portion along each inner circumferential edge portion thereof, said second ring being of a width intermediate that of the cross-sectional dimension of said first ring and the width of the groove, said second ring being disposed within said groove and seated in snug engagement on the outer circumferential surface of said first ring whereby fluid pressure will exert pressure against said first ring via the space between the edge of the second ring and the groove to cause the first ring to flow into the zone created by the downstream chamfer of the second ring and the portion of the groove adjacent thereto.

3. In combination with a circumferentially grooved piston, a fluid seal comprising a deformable first ring seated in the groove and having a cross-sectional dimension smaller than the width of the groove, a second ring composed of material having a lower coefficient of friction than the piston material and the first ring material, said second ring being seated upon said first ring and being of greater width than the latter and less width than the groove, the outer peripheral surface of said second ring extending outwardly from the piston walls for slidably engaging a cylinder wall.

4. In combination with a grooved wall and a surface adjacent the wall, a fluid seal comprising a deformable first member seated in the groove and having a cross-sectional dimension smaller than the width of the groove, a second member having a lower coefficient of friction than the wall material and the first member material, said second member engaging said first member to confine the latter between the bottom of the groove and the second member, said second member further being of greater width than the width of the first member and of lesser width than the groove, a surface of said second member extending beyond the wall to engage the adjacent surface.

References Cited in the file of this patent

UNITED STATES PATENTS

| | | |
|---|---|---|
| 1,998,356 | Brown | Apr. 16, 1935 |
| 2,509,672 | Christensen | May 30, 1950 |
| 2,567,527 | Parks | Sept. 11, 1951 |
| 2,607,644 | Smith | Aug. 19, 1952 |
| 2,736,164 | Piquerez | Feb. 28, 1956 |
| 2,739,855 | Bruning | Mar. 27, 1956 |
| 2,751,629 | Dick | June 26, 1956 |
| 2,779,996 | Tanis | Feb. 5, 1957 |
| 2,784,013 | Groen | Mar. 5, 1957 |
| 2,824,362 | Myers | Feb. 25, 1958 |